June 3, 1941. H. E. WURZBACH ET AL 2,243,936
ELONGATED VIBRATORY CONVEYER
Filed June 14, 1940 2 Sheets-Sheet 1

Inventors
HUGH E. WURZBACH,
CLYDE H. KONOLD,
By Alfred W. Knight
Attorney

Inventor
HUGH E. WURZBACH,
CLYDE H. KONOLD,
By Alfred M. Knight
Attorney

Patented June 3, 1941

2,243,936

UNITED STATES PATENT OFFICE 2,243,936

ELONGATED VIBRATORY CONVEYER

Hugh E. Wurzbach and Clyde H. Konold, Magna, Utah

Application June 14, 1940, Serial No. 340,486

8 Claims. (Cl. 198—220)

This invention relates to vibratory conveyers of the type having an elongated conveyer body portion resiliently supported with respect to a base member by means of cantilever supports which are connected to the body portion at longitudinally spaced intervals. The invention pertains more particularly to such conveyers in which the body portion has sufficient internal longitudinal resilience to be subject to appreciable internal longitudinal vibration.

This "internal longitudinal resilience" is a natural result of the fabrication of the conveyer body from materials of a resilient nature, in that compression waves may be set up longitudinally in the conveyer body, allowing one portion of the length of the body to vibrate with different characteristics than other portions. In mild steel structures, this effect is noticeable in conveyers having driven portions fifteen or more feet in length, i. e., in structures such that a portion driven by one vibratory motor extends fifteen or more feet from the point of application of the driving forces.

For the purposes of this application we shall call a uniform conveying action a "normal conveying action," since such conveying action has previously been the desideratum. The arrangement of the cantilever supports, which we may call the "normal arrangement," to bring about the normal conveying action depends on the length of the conveyer body and number and points of attachment of the vibratory motor means. The normal arrangement of cantilever supports for elongated conveyers of different lengths and different numbers of driving motors is the subject of our copending application Ser. No. 324,136, filed March 15, 1940, and is discussed in considerable detail therein.

As pointed out in said application, with conveyer bodies fabricated from a common material such as mild steel all of the cantilever supports are of the same stiffness as long as the conveyer body is less than 30 feet in length, whether it is driven by a single vibratory motor or is driven by a plurality of spaced vibratory motors. Thus, for conveyers which have bodies less than 30 feet in length the normal arrangement of the supports consists in providing supports of uniform stiffness at all positions along the conveyer body.

It has also been pointed out in said application that in unitary conveyer bodies having a length in excess of thirty feet, cantilever supports or reeds having the same stiffness may be used at all portions of the conveyer body to provide normal conveying action, or a different distribution of reeds may be required to provide normal conveying action, depending on the position or positions of the points of attachment of the vibratory motor means. Various examples of normal distribution will be described in greater detail in the ensuing specific description.

It has been found that it is not always desirable to have a normal conveying action and that it is sometimes highly desirable to produce an accentuated conveying action in a particular portion of the conveyer body. For example, in conveyers which are used in drying operations, the material at the receiving end of the conveyer may be damp and difficultly conveyable, and at the discharge end it may be drier and more easily conveyable. Thus in order to get the optimum performance from a conveyer operating under such conditions, it is desirable to accentuate the conveying action at the receiving end with respect to the discharge end, wherefore the resulting conveying action of the conveyer as a whole is established at a maximum.

It is therefore the principal object of this invention to provide an elongated vibratory conveyer having a conveying action which is accentuated throughout a desired portion with respect to the conveying action at other portions.

A more particular object of this invention is to provide an elongated vibratory conveyer having accentuated conveying action at the feed end with respect to the conveying action at the discharge end.

We attain the above and other objects that will appear in the ensuing description by providing an elongated vibratory conveyer having stiffer reeds than required for the normal arrangement of reeds, adjacent the conveyer portion in which the accentuated conveying action is desired, as more specifically pointed out in the ensuing description of the drawings, in which.

Figures 3, 3A, 4:
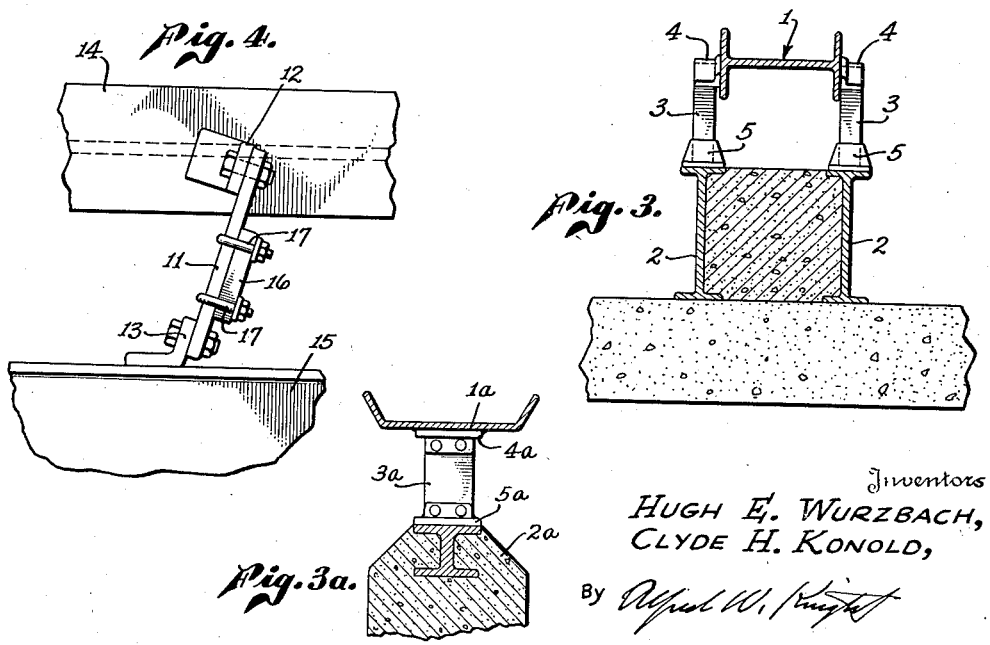
Fig. 3 is a transverse section taken on line 3—3 in Fig. 2.
Fig. 3a is a view corresponding to Fig. 3, showing a modified form of conveyer.

Fig. 4 is a fragmentary view of a single supporting reed, showing one arrangement which may be used for changing the stiffness of such a reed for the purposes of this invention; and Figs. 5 through 13 illustrate, in a schematic fashion, nine alternative arrangements of elongated conveying members provided with vibratory supporting elements for obtaining the accentuated conveying action according to our invention and illustrating the application thereof to various types of conveyers.

Referring to Figs. 1-4 of the drawings, an elongated trough-like conveyer body member is indicated at 1, supported on a base 2 through the agency of vibratory reeds or cantilever supports 3 secured to the trough 1 and the base or support 2 by means of brackets 4 and 5 at the respective upper and lower ends of the supports. The trough 1 is operatively connected as at 6 to a vibratory motor 7 independently supported with respect to the trough 1 by means of a motor support member 8 and, in this embodiment, disposed adjacent one end of the trough. The vibratory motor is adapted to impart a vibratory conveying motion to the body at a predetermined frequency in a direction having a substantial component along the length of the body. The reeds or cantilever supports 3 are preferably disposed directly opposite one another at the respective longitudinal sides of the conveyer trough 1, and are preferably also spaced longitudinally at intervals of not in excess of about two feet. Advantageously, these intervals may be made about one foot or less, in order to realize most fully the advantages of the invention.

Figure 1:
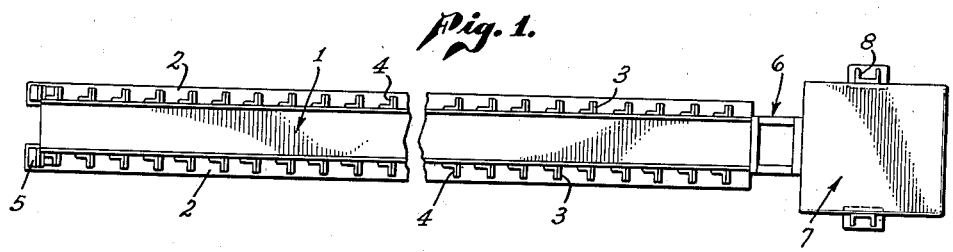
Fig. 1 is a plan view of a typical elongated vibratory conveyer according to our invention, with the center section broken away.
Figure 2:
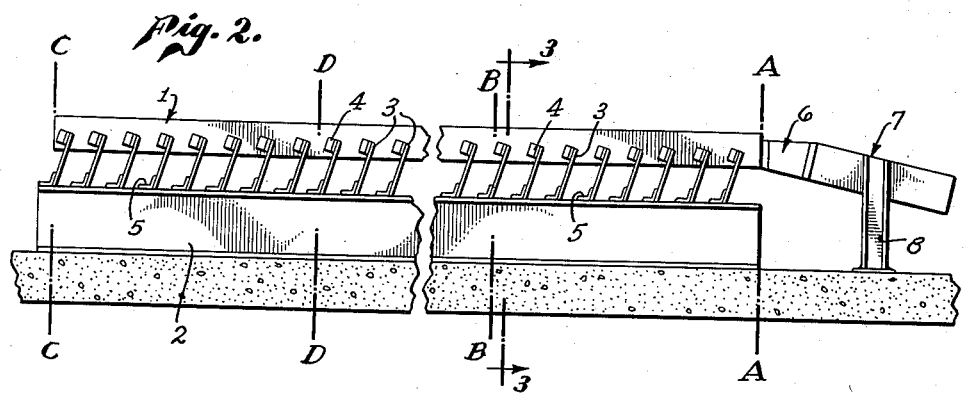
Fig. 2 is a corresponding side elevation thereof.

While in the illustration of the one specific form of the invention in Figs. 1, 2 and 3 we have shown the supporting reeds as arranged in two cooperating series, one series disposed along each side of the conveyer trough, it will be appreciated that one might employ, with full equivalency, a single series of supporting reeds arranged centrally of the width of the conveyer trough. Such a construction is illustrated in Fig. 3a, comprising a trough member 1a, supported on a base member 2a through the agency of a single series of longitudinally spaced cantilevers 3a secured to the trough member and base as at 4a and 5a. Similarly, the supporting reeds may be arranged in depending relation, with their upper ends secured to a fixed upper support structure and their lower ends secured to the conveyer trough, without departure from the spirit and scope of our invention.

The motor 7 may be of any desired type, such as of the electromagnetic type illustrated in our issued U. S. Patents Nos. 2,102,826 and 2,071,373, if desired, although any equivalent motor means may alternatively be employed. The motor means will be of a type adapted to produce relatively high-frequency vibratory movement, such as on the order of 2,000 to 10,000 cycles per minute, as is conveniently obtained in the electromagnetic type by the use of alternating current, commercial frequencies of 50 or 60 cycle current providing 3,000, 3,600, 6,000 and 7,200 cycles per minute, depending upon the current frequency and type of energization employed on the electromagnet.

It is to be pointed out that the frequency of vibration of an assembly comprising a cantilever support having a weighted free end is dependent upon the weight or mass vibrated and the restoring force which is stored up in the resilient support due to a given deflection. Thus the expression "stiffness" is so related to the restoring force exhibited by a given cantilever that a change in stiffness could be considered as a change in cross-section, material, length or rigidity of mounting of such cantilever. For example, a reed of given cross-section and material may be rendered less stiff and thus have its normal vibratory frequency lowered by loosening one of the brackets 4 or 5. As another example, a reed of given cross-section and material may be stiffened as by bolting a stiffening block to the flexible portion thereof to give the effect of shortening the support. This latter expedient is illustrated in Fig. 4, wherein a reed support is shown at 11, secured in brackets 12 and 13 fastened to a conveyer 14 and a base 15 and corresponding to the brackets 4 and 5 above, a stiffening block 16 being bolted to the reed 11 as at 17. In case the above-described expedients for decreasing or increasing the stiffness of the support are not resorted to, it should be apparent that supports of different cross-section or material may be substituted therefor.

The construction illustrated in Figs. 1-4 is typical of that used in practice. Assuming that the conveyer body is unitary and is sufficiently long as to be subject to appreciable internal longitudinal vibration due to its own elasticity, for example, greater than 15 feet in length and less than 30 feet in length, normal conveying action is obtained when each of the reeds 3 is of the same stiffness. Such an arrangement of reeds is the normal arrangement.

If now it is desired to produce an accelerated conveying action at one position on this conveyer body, we increase the stiffness of the reeds at this position beyond that required for the normal arrangement. For example, if we desire to accentuate the conveying action at the receiving end of the body, which in this case is also the driven end, we make the reeds at this end stiffer than required by the normal arrangement. For example, we provide the stiffer reeds at positions between the lines A—A and B—B as shown in Fig. 2. If, for example, we desire to accentuate the conveying action at the discharge end of this conveyer, we provide reeds at the positions between lines C—C and D—D which are stiffer than those required for the normal arrangement.

In order to obtain the best conveying efficiency from the power consumption standpoint it is desirable, if not necessary from a practical standpoint, to have the period of the conveyer structure as a unit substantially equal to that of the vibratory motor means, i. e., to provide a "tuned" condition for the conveyer as a whole. It should be kept in mind then, that in speaking of the normal arrangement of supports, such arrangement is adapted not only to produce a substantially uniform conveying action but also to produce a structure having a period which is substantially the same as the period of the motor means.

In other words the weight of the vibrated mass and sum of the stiffnesses of the individual supports, i. e., the force required to produce a given movement of the vibrated mass, are so related with the normal arrangement that the period of the conveyer is substantially the same as that of the driving means. Hence, it must follow that if some of the reeds are made stiffer than required by the normal arrangement, others of the reeds must be decreased in stiffness to maintain the desired periodicity. Therefore, when the reeds connected to the conveyer portion between the lines A—A and B—B are stiffened to produce an accentuated conveying action in that portion as above described, the reeds connected to all or part of the remaining portion, for example, the reeds connected to the portion between the lines C—C and D—D, will be decreased in stiffness in order to maintain the sum total stiffness of the reeds substantially the same as that required for the normal arrangement.

The same considerations apply when the reeds connected to the conveyer portion between the lines C—C and D—D are stiffened, also as described above, to produce an accentuated conveying action at that portion. Thus the stiffness of the reeds connected to all or a part of the remaining portion, for example the portion between the lines A—A and B—B, will be decreased in stiffness.

Figure 5:
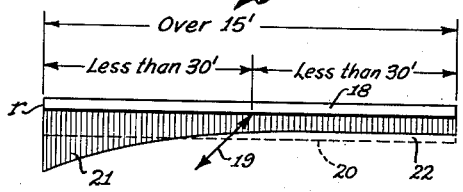

In Figs. 5 to 13 conveyers of different length and numerous driving arrangements therefor which may be encountered in practice are diagrammatically illustrated. Referring to Fig. 5 a unitary conveyer body 18 of sufficient length to be subject to appreciable longitudinal vibration due to its own resilience, say a length of over 15 feet, is driven by a vibratory motor 19 which is connected thereto intermediate its ends. In this figure the distance from either end of the conveyer body to the motor is less than 30 feet, in which case the normal arrangement of supports calls for supports of the same stiffness at all positions along the conveyer. The stiffness of the supports required for the normal arrangement is indicated by the depth of the area beneath the conveyer body enclosed by the dotted line 20, which in this case is seen to be of uniform depth. To produce an accentuated conveying action at the receiving end $r$ of this conveyer the supports at the receiving end are increased in stiffness beyond that required for the normal arrangement. In order to keep the desired periodicity of the conveyer, or "tuned" condition, the supports connected to the other portion of the conveyer are decreased in stiffness. The stiffness of the supports at the different positions to produce the desired accentuated conveying action is indicated by the depth of the vertically hatched section at the different positions. It will be noted that the stiffness is greater than that required for the normal arrangement at the receiving end as indicated at 21 and is less than that required for the normal arrangement at the discharge end as indicated at 22.

In Figs. 8–13 the normal arrangement of the supports is similarly indicated by the depth of the area beneath the conveyer which is bounded by dotted lines. The arrangement required for accentuated conveying action at a position is designated by a vertically hatched area. The depth by which the vertically hatched area extends below the dotted area at any position indicates an increased stiffness to produce accentuated conveying action. The depth by which the dotted area extends below the hatched area at any position indicates a decreased stiffness which is required to offset the increased stiffness to maintain the desired periodicity of the system.

Figure 6:
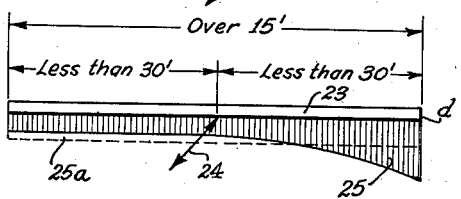

In Fig. 6 we have illustrated a unitary conveyer body 23 provided with a motor 24 attached thereto intermediate its ends, which arrangement is comparable to that shown in Fig. 5, but in this case the conveying action at the discharge end has been accentuated. This has been accomplished by increasing the stiffness of the reeds or cantilever supports at the discharge end $d$ beyond that required for the normal arrangement, as indicated by the depth by which the hatched area extends beneath the dotted line as at 25.

It is not necessary to provide the increased stiffness of the reeds in a graduated manner as illustrated in Figs. 5 and 6 in order to bring about accentuated conveying action at a desired position, inasmuch as the reeds may be increased in stiffness by the same amount at all positions along the conveyer where it is desired to have the accentuated action. For example, referring to Fig. 7, it may be desired to produce an accentuated conveying action at all points between the receiving end $r$ of a unitary conveyer body 26 provided with a motor 27 and the position of the driving motor (i. e., the point of application of the driving forces). This may be accomplished by providing reeds increased in stiffness by the same amount under the receiving end $r$ as indicated at 28. This conveyer may otherwise be the same as that illustrated in Fig. 5.

In the preceding examples the accentuated conveying action was produced in the portion of the conveyer between the point of attachment of the driving motor and one end. This specific arrangement is not essential. Thus, in Fig. 8, we have shown a unitary conveyer body 31 provided with a driving motor 32 attached thereto at a position adjacent the receiving end $r$. In order to provide an accentuated conveying action from the receiving end to a position past the position of the driving motor, the supports have been stiffened along that portion of the conveyer body as indicated at 33.

Figure 9:
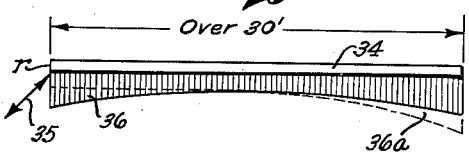

In Fig. 9 a conveyer having a unitary body 34 over 30 feet in length is shown driven from its receiving end $r$ by suitable vibratory motor means 35. In accordance with the teaching of our copending application above referred to, the normal arrangement of reeds requires stiffer reeds at positions removed from the point of attachment of the driving motor, as indicated by the depth of the area bounded by dotted lines. If it is desired to accentuate the conveying action at the receiving end $r$, the stiffness of the reeds is increased at this end, as indicated at 36.

Figure 10:
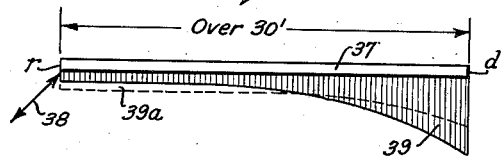

In Fig. 10 a unitary conveyer body 37 comparable to that illustrated in Fig. 9 is shown provided with suitable vibratory motor means 38 attached to its receiving end $r$. To produce an accentuated conveying action at the discharge end $d$, the stiffness of the reeds at this end has been increased over that required by the normal arrangement as indicated at 39.

Figure 11:
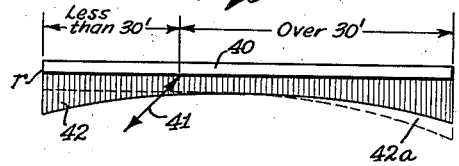
Figure 7:
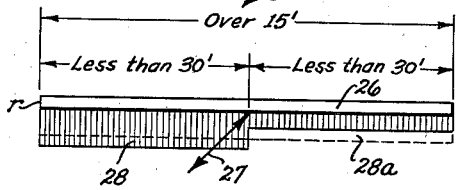

In Fig. 11 a unitary conveyer body 40 having a length of over 30 feet is shown driven by a vibratory motor 41 which is attached thereto at a position more than 30 feet from one end and less than 30 feet from the other end of the body. The normal arrangement of the supporting reeds is that those adjacent the end of the conveyer farthest removed from the point of attachment of the driving motor are stiffer than those adjacent the driving motor to conform to the teachings of the above-mentioned copending application, while the reeds located between the driving motor and the end nearest thereto have substantially equal stiffness, in accordance with the teaching of our above-mentioned copending application, as indicated by the depth of the area bounded by dotted lines. To accentuate the conveying action at the receiving end $r$ of such a conveyer the reeds adjacent that end will have their stiffness increased as indicated at 42.

Figure 12:
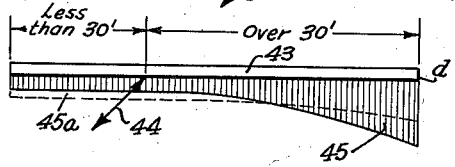
Figure 8:
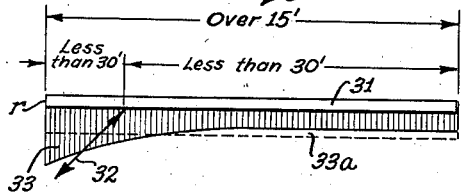

Fig. 12 illustrates a unitary conveyer body 43 such as illustrated in Fig. 11 provided with a driving motor 44 attached thereto at a position intermediate its ends. In this case the conveyer is adapted to produce an accentuated conveying action at the discharge end $d$. The reeds at this end are stiffened beyond the stiffness required for normal operation, as indicated at 45.

Figure 13:
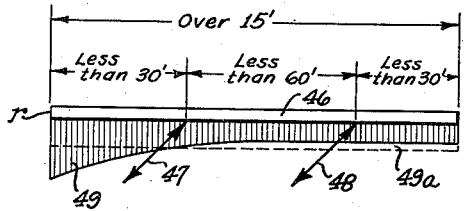

In Fig. 13 a unitary conveyer body 46 over 15 feet in length is provided with a pair of spaced driving motors 47 and 48 which are attached to the body at points which are less than 60 feet apart. Each point of attachment is less than 30 feet from its nearest end of the conveyer. With such a device the normal arrangement requires uniformly stiff reeds at all longitudinal positions as indicated by the area bounded by dotted lines. To produce an accentuated conveying action at the receiving end $r$, for example, the reeds adjacent that end will be stiffened beyond that required for the normal arrangement as indicated at 49.

In Figs. 6–13 it will be noted that an increase in stiffness to produce accentuated conveying action at one position is accompanied by a decrease in stiffness at another position, in order to preserve the desired "tuned" condition of the conveyer as a whole. The decrease in stiffness is indicated at 25a, 28a, 33a, 36a, 39a, 42a, 45a, and 49a in Figs. 6–13 respectively.

Other normal arrangements of reeds for normal conveying action are illustrated in our above-mentioned application. However, since the provision of a normal arrangement is not the subject of this application, further description of such normal arrangements is not believed necessary to a complete understanding of our present invention. The above examples should serve to show that the changes in construction required to produce the accentuated conveying action according to our invention are independent of the number and positions of attachment of the driving motors and independent of the normal arrangement of the cantilever supports.

We consider our invention subject to some modification, hence we do not wish to be strictly limited to the above description, but rather to the scope of the following claims.

We claim:

1. An elongated vibratory conveyer of the "tuned" type having an accentuated conveying action at a longitudinal position, comprising: a support; an elongated conveyer body of such length and resilience as to be capable of appreciable internal longitudinal vibration when vibratory conveying motion is imparted thereto at a predetermined frequency; a plurality of longitudinally spaced cantilever supports mounted on said support and connected to said body in supporting relation thereto at intervals throughout the length of said body for supporting said body relative to said support; and vibratory motor means operatively associated with said body and adapted to impart a vibratory conveying motion thereto at said predetermined frequency in a direction having a substantial component along the length of said body, the cantilever supports connected to said body adjacent one longitudinal position therealong being stiffer than the supports required for "tuned" normal conveying action adjacent said position, whereby an accentuated conveying action is obtained at said one position while maintaining said conveyer as a whole in a substantially "tuned" condition.

2. A conveyer as set forth in claim 1, said one longitudinal position being located adjacent the receiving end of said body.

3. A conveyer as set forth in claim 1, said one longitudinal position being located adjacent the discharge end of said body.

4. An elongated vibratory conveyer of the "tuned" type having an accentuated conveying action at a longitudinal position, comprising: a support; an elongated conveyer body of such length and resilience as to be capable of appreciable internal longitudinal vibration when vibratory conveying motion is imparted thereto at a predetermined frequency; a plurality of longitudinally spaced cantilever supports mounted on said support and connected to said body in supporting relation thereto at intervals throughout the length of said body for supporting said body relative to said support; and vibratory motor means operatively associated with said body and adapted to impart a vibratory conveying motion thereto at said predetermined frequency in a direction having a substantial component along the length of said body, the total stiffness of the cantilever supports connected to said body being substantially the same as required by the normal arrangement for "tuned" operation, the supports connected to said body adjacent said one position being stiffer than required for the normal arrangement, whereby an accentuated conveying action is obtained at said one position while maintaining said conveyer as a whole in a substantially "tuned" condition.

5. A conveyer as set forth in claim 4, said one longitudinal position being located adjacent the receiving end of said body.

6. A conveyer as set forth in claim 4, said one longitudinal position being located adjacent the discharge end of said body.

7. An elongated vibratory conveyer of the "tuned" type having an accentuated conveying action at a longitudinal position comprising: a support; an elongated conveyer body of such length and resilience as to be capable of appreciable internal longitudinal vibration when vibratory conveying motion is imparted thereto at a predetermined frequency; a plurality of longitudinally spaced cantilever supports mounted on said support and connected to said body in supporting relation thereto at intervals throughout the length of said body for supporting said body relative to said support; and vibratory motor means operatively associated with said body and adapted to impart a vibratory conveying motion thereto at said predetermined frequency in a direction having a substantial component along the length of said body, the total stiffness of the cantilever supports connected to said body being such as to establish the period of said conveyer substantially at the period of the vibratory motor means for operation at said predetermined frequency, the supports connected to said body adjacent said one position being stiffer than required for the normal arrangement, whereby an accentuated conveying action is obtained at said one position.

8. An elongated vibratory conveyer of the "tuned" type having an accentuated conveying action at a longitudinal position, comprising: a support; an elongated conveyer body of such length and resilience as to be capable of appreciable internal longitudinal vibration when vibratory conveying motion is imparted thereto at a predetermined frequency; a plurality of longitudinally spaced cantilever supports mounted on said support and connected to said body in supporting relation thereto at intervals throughout the length of said body for supporting said body relative to said support; and vibratory motor means operatively associated with said body and adapted to impart a vibratory conveying motion thereto at said predetermined frequency in a direction having a substantial component along the length of said body, the supports connected to said body adjacent said one position being stiffer than required for the normal "tuned" arrangement and the supports connected to said body adjacent another position being less stiff than required for the normal "tuned" arrangement, whereby an accentuated conveying action is obtained at said one position while maintaining said conveyer as a whole in a substantially "tuned" condition.

HUGH E. WURZBACH.
CLYDE H. KONOLD.